United States Patent
Stoffels et al.

(10) Patent No.: US 6,786,536 B2
(45) Date of Patent: Sep. 7, 2004

(54) BODY STRUCTURE OF MOTOR VEHICLES

(75) Inventors: Oliver Stoffels, Ludwigsburg (DE); Dieter Steinhauser, Remshalden (DE); Thomas Meier, Rheinstetten (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/351,578

(22) Filed: Jan. 27, 2003

(65) Prior Publication Data

US 2003/0168887 A1 Sep. 11, 2003

(30) Foreign Application Priority Data

Jan. 26, 2002 (DE) .......................... 102 02 985

(51) Int. Cl.⁷ .................. B62D 25/08; B62D 27/02; B62D 29/04; B60K 5/00
(52) U.S. Cl. .................. 296/193.03; 296/193.08; 296/203.04; 296/901.01; 180/89.17; 180/232; 180/295
(58) Field of Search .................. 296/193.01, 193.03, 296/193.04, 193.08, 193.09, 196, 203.01, 203.02–203.04, 903; 180/89.17, 232, 295; 248/638

(56) References Cited

U.S. PATENT DOCUMENTS

| 2,128,930 A | * | 9/1938 | Fageol et al. ............... 180/291 |
| 2,678,231 A | * | 5/1954 | Barenyi ................ 296/193.03 |
| 2,700,570 A | * | 1/1955 | Barenyi ................ 296/193.03 |
| 3,011,796 A | * | 12/1961 | Barenyi ..................... 180/295 |
| 4,216,839 A | | 8/1980 | Gould et al. |
| 4,422,685 A | * | 12/1983 | Bonfilio et al. ......... 296/193.04 |
| 4,573,707 A | | 3/1986 | Pabst |
| 4,811,812 A | * | 3/1989 | Cassese ...................... 180/295 |
| 4,869,539 A | * | 9/1989 | Cassese ...................... 280/781 |
| 5,035,397 A | | 7/1991 | Yamada ....................... 248/638 |
| 5,401,056 A | * | 3/1995 | Eastman ..................... 280/785 |
| 5,704,644 A | * | 1/1998 | Jaggi ........................... 280/796 |
| 5,960,901 A | | 10/1999 | Hanagan |
| 6,003,935 A | | 12/1999 | Kalazny |
| 2003/0141746 A1 | * | 7/2003 | Stoffels et al. ......... 296/203.02 |
| 2003/0168887 A1 | * | 9/2003 | Stoffels et al. ......... 296/193.09 |

FOREIGN PATENT DOCUMENTS

| DE | 767115 | 10/1951 |
| DE | 3927485 A1 | 3/1990 |
| DE | 3932196 C1 | 12/1990 |
| DE | 4330044 A1 | 3/1995 |
| DE | 19860794 | 7/2000 |
| EP | 0 295 661 | 6/1988 |
| EP | 0295662 A2 | 12/1988 |
| EP | 0372987 A2 | 6/1990 |
| EP | 0523831 A1 | 1/1993 |
| EP | 0594131 A1 | 4/1994 |
| FR | 940.982 | 12/1948 |
| GB | 503514 | 4/1939 |
| GB | 2317858 A | 4/1998 |

OTHER PUBLICATIONS

Page 138 of IT Zeitschrift Quattroroute 45 (2000) 531, Jan.
European Search Report mailed Jan. 12, 2004.

* cited by examiner

Primary Examiner—D. Glenn Dayoan
Assistant Examiner—Paul Chenevert
(74) Attorney, Agent, or Firm—Crowell & Moring LLP

(57) ABSTRACT

This body structure is suitable for motor vehicles, especially for passenger cars and comprises a passenger compartment structure and at least one supporting structure adjoining thereon, for example, for accommodating a driving unit and wheel suspension elements. The supporting structure is connected to the passenger compartment structure through holding elements. To optimize the supporting structure, having a region connecting with the passenger compartment structure and a rear end region, the supporting structure is formed as an enveloping device of a high-strength, especially a fiberglass reinforced plastic, which is reinforced with a supporting device and surrounds the driving unit at least regionally, the enveloping device having several openings, each of which forms an access to the driving unit, and being provided with bearing mountings for the driving unit.

40 Claims, 7 Drawing Sheets

BODY STRUCTURE OF MOTOR VEHICLES

BACKGROUND AND SUMMARY OF THE INVENTION

This applications claims the priority of German Patent Document 102 02 985.7 filed on Jan. 26, 2002, the disclosure of which is expressly incorporated by reference herein.

The invention relates to the body structure for motor vehicles, especially for passenger cars with a passenger compartment structure and at least one supporting structure adjoining thereon for accommodating a driving unit and wheel suspension elements, which supporting structure is connected through holding elements with the passenger compartment structure.

A vehicle, known from French Patent No. 940,982, comprises a body structure with a passenger compartment structure, which is bounded by a front supporting structure and a rear supporting structure. Both supporting structures are formed by metallic lattice frames, one of the two supporting structures accommodating a driving unit. Bearing eye-like extensions, which are embraced by bearing forks, mounted at tubular supports of the supporting structures, lead away from the passenger compartment structure.

European Patent Document EP 0 295 661 A2 relates to a rear supporting structure, which is connected through the agency of yielding elements with a passenger compartment structure. Said supporting structure is formed by a tubular frame construction, comprising upper and lower longitudinal supports and transverse supports, between which back-up beams extend. Moreover, provisions have been made at this tubular frame construction to accommodate a driving unit and wheel suspension elements.

The periodical, *IT Quattroroute* 45 (2000) 531 (January), page 138, discloses a passenger car of the high-performance category, which has a body structure with a two-seater passenger compartment structure. This passenger compartment structure consists of a high-strength plastic and is interlocked directly with a driving unit, that is, a supporting structure is not interposed. The driving unit is installed between the wheel axles, however, adjacent to the rear axle—centrally placed engine arrangement—in the passenger car.

It is an aspect of the invention to provide a body structure for a motor vehicle with a passenger compartment structure, which can be connected easily with a supporting structure accommodating a driving unit. Moreover, the supporting structure should have low weight, be distinguished by a high strength and be integrated spatially advantageously in the motor vehicle.

Pursuant to certain preferred embodiments of the invention, this aspect may be accomplished in that the supporting structure, having a region connecting to the passenger compartment structure and a rear end region, is constructed as an enveloping device of high strength which is reinforced with a supporting device and surrounds the driving unit all around at least regionally, the enveloping device having several openings, providing access to the driving unit, and being provided with bearing mountings for the driving unit and the wheel suspension elements. Further distinguishing features, developing the invention, are contained below and in the dependent claims.

The main advantages, achieved with certain preferred embodiments of the invention, are to be seen therein that the supporting device of the body structure is formed as an enveloping device of the driving unit, which is tubular in cross section, comprises an internal combustion engine, a clutch and a transmission and is connected firmly with the passenger compartment structure. At the enveloping device, which is reinforced with supports and manages without reinforcing ribs, which take up space, the driving unit is held so that it can function properly and, because it consists of a high strength plastic, especially a fiberglass-reinforced plastic, weighs little and has an outstanding torsional and bending strength. Moreover, the enveloping device surrounds the outer contours of the driving aggregate basically all around, the driving aggregate being accessible through openings in the enveloping device and held by it in position at bearing mountings. These bearing mountings can be integrated easily in the enveloping device, the latter comprising an upper part and a lower part. This facilitates, on the one hand, its production and, on the other, the installation and also the dismantling of the driving unit. Finally, the possibility exists of connecting the driving unit and the enveloping device as a prefabricated module with the passenger compartment structure.

Other objects, advantages and novel features of the present invention will become apparent from the following detailed description of the invention when considered in conjunction with the accompanying drawings.

DETAILED DESCRIPTION OF THE DRAWINGS

Figure 10:
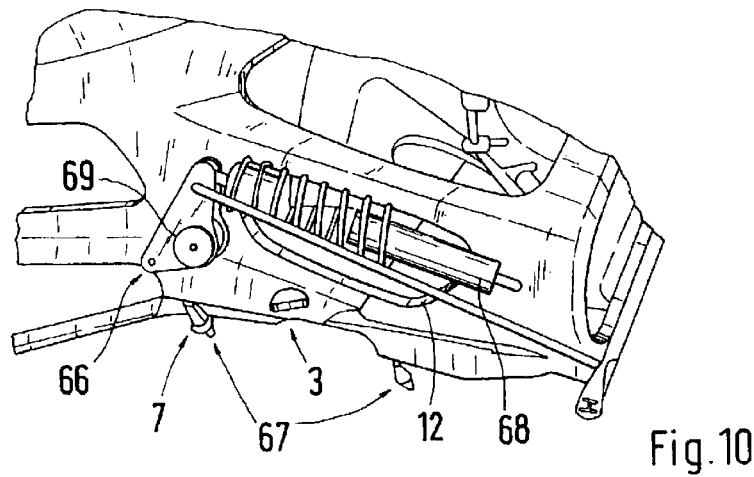
FIG. 10 shows a partial view of the supporting structure with wheel suspension elements.
Figure 11:
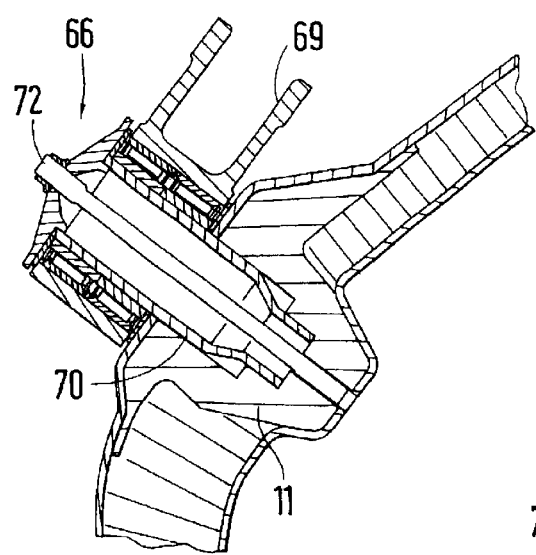
FIG. 11 shows a section of the wheel suspension element of the supporting structure of FIG. 9.
Figure 12:
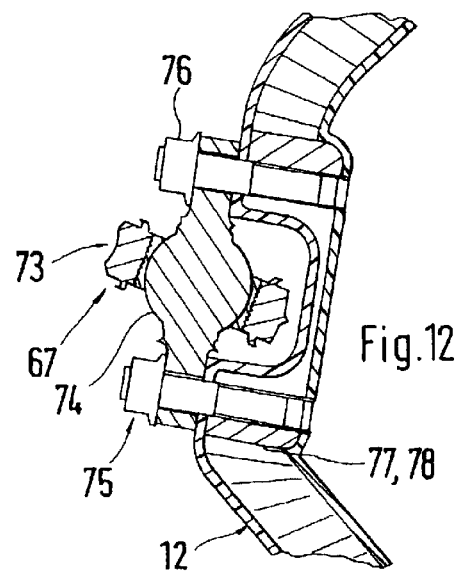
FIG. 12 shows a section of the supporting journal of the supporting structure of FIG. 10.

Only a body structure 1 is shown of a motor vehicle or a passenger car of the high-performance category. It comprises, for example, a passenger compartment structure 2, comprising a high-strength plastic and a supporting structure 3. Through the agency of holding elements, constructed, for example, of screws 4, the supporting structure 3 is connected to a rear transverse wall 5 of the passenger compartment structure 2 and accommodates a driving unit 6 and wheel-suspension elements 7 (FIG. 10). The driving unit 6 is formed by an internal combustion engine 8, a clutch and a transmission 9, the internal combustion engine 8 extending between wheel axles of the motor vehicle, however, adjacent to a rear axle—centrally-placed engine arrangement.

As seen in the longitudinal direction of the vehicle, the supporting structure 3 extends between a connecting region 10, adjacent to the transverse wall 5 of the passenger compartment structure 2, and a rear end region 11, facing a rear of the motor vehicle, and is configured as an enveloping device 12, which surrounds, in an interior space 13, at least a portion of the housing of the driving unit 6. The enveloping device 12, which has openings 14, 15, 16, 17, 18, 19, 20, 21, 22 and 23 forming an access to the driving unit 6 and is free of transverse and longitudinal struts in its space 13, is made from high-strength, especially fiberglass reinforced plastic and reinforced with a supporting device 24. The supporting device 24 is equipped with transverse supports 25, 26 and 27 and longitudinal supports 28, 29, 30, 31, 32, 33 and 34. The transverse supports 25 and 27 extend adjacent to the connecting region 10 and to the end region 11; the transverse support 26 extends in a central region of the enveloping device 11 and, as seen in the longitudinal direction of the vehicle, is disposed between the transverse supports 25 and 27. The course and the dimensioning of the transverse supports as well as of the longitudinal supports of the supporting device 24 are determined on the one hand, by the dimensions of the driving unit 6 and, on the other, by the static and dynamic loads, which act on the enveloping device 12, the use of iterative and computational measures being suitable for the structural configuration of the latter.

Figure 6:
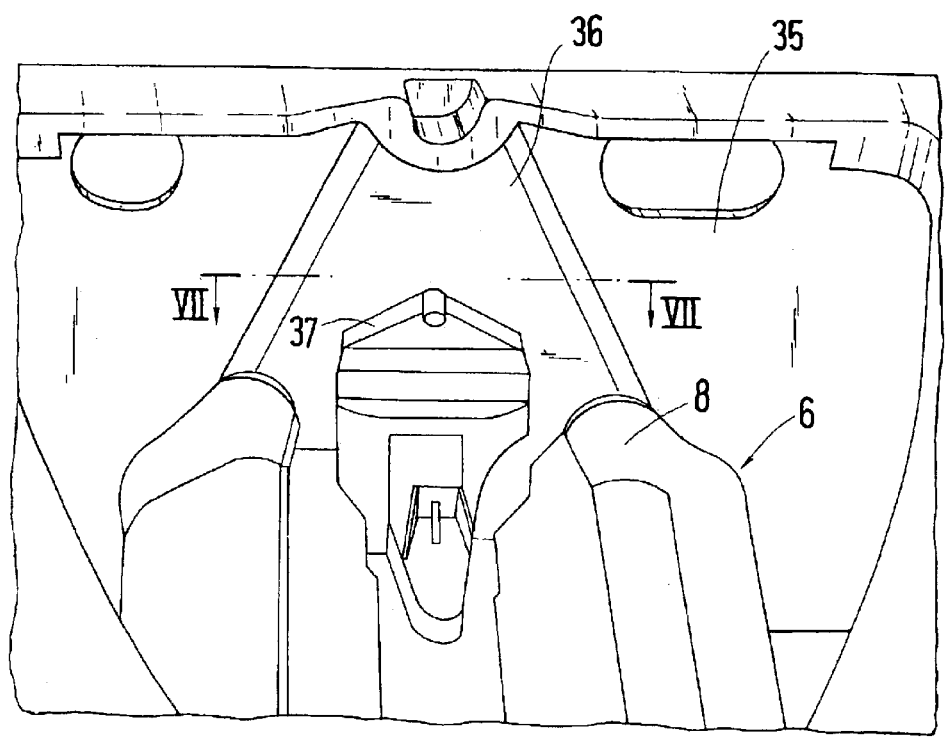
FIG. 6 shows a view at an angle from above of the closing wall of the supporting structure.
Figure 7:
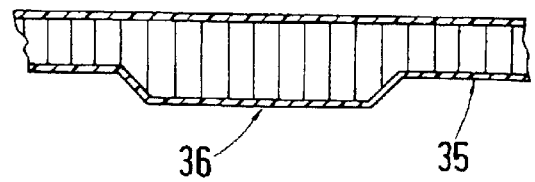
FIG. 7 shows a section along the line VII—VII of FIG. 6.
Figure 8:
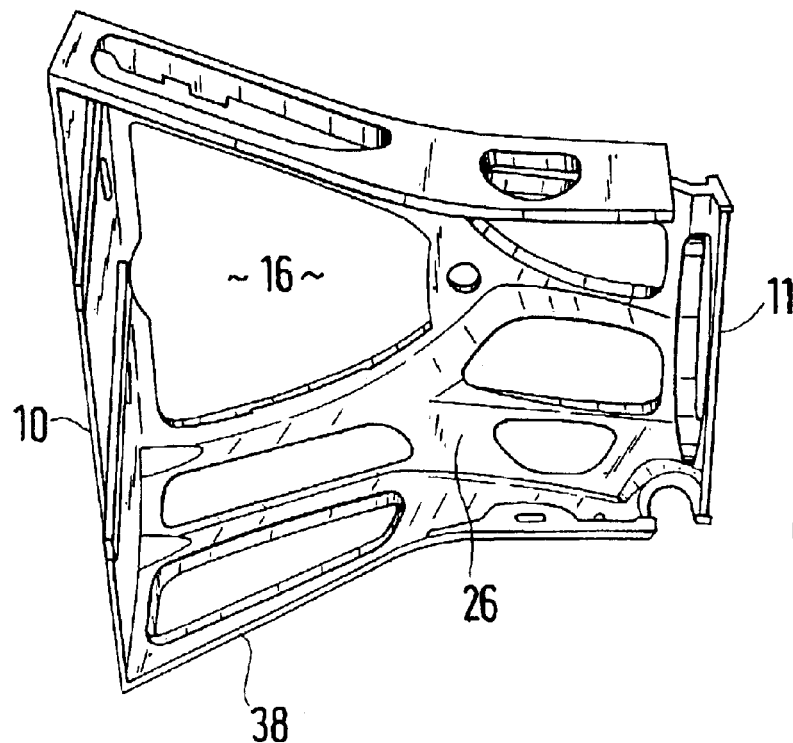
FIG. 8 shows an inclined view from below of an upper part of the supporting structure.
Figure 9:
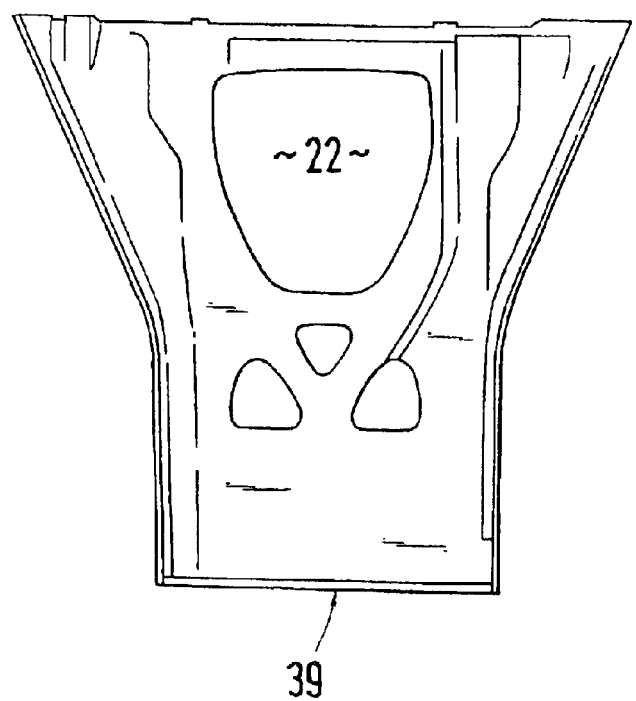
FIG. 9 shows a view from above of a lower part of the supporting structure.

In the connecting region 10, the enveloping device 12 has a closing wall 35, which extends basically over the whole height Hg and the whole width Bg of said enveloping device and is integrated the latter as a fiberglass-reinforced part. The closing wall is provided with a local cross-sectional expansion 36, of a bearing mounting of a first suspension bearing 37 of the driving unit 6 (FIG. 6). This cross-sectional expansion 36 is a thickening, shaped in the direction of the driving unit 6, extend over the whole height Hg of the closing wall 35 and has the shape of an inverted V.

Figure 1:
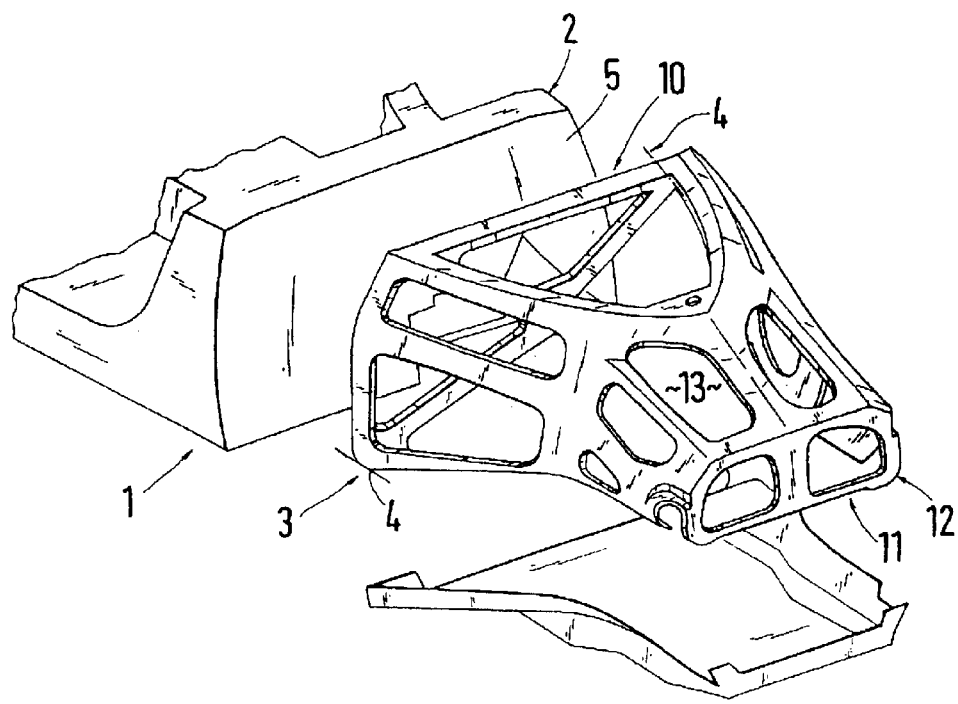
FIG. 1 shows an inclined view of a diagrammatical body structure of a motor vehicle with a passenger compartment structure and a supporting structure.
Figure 2:
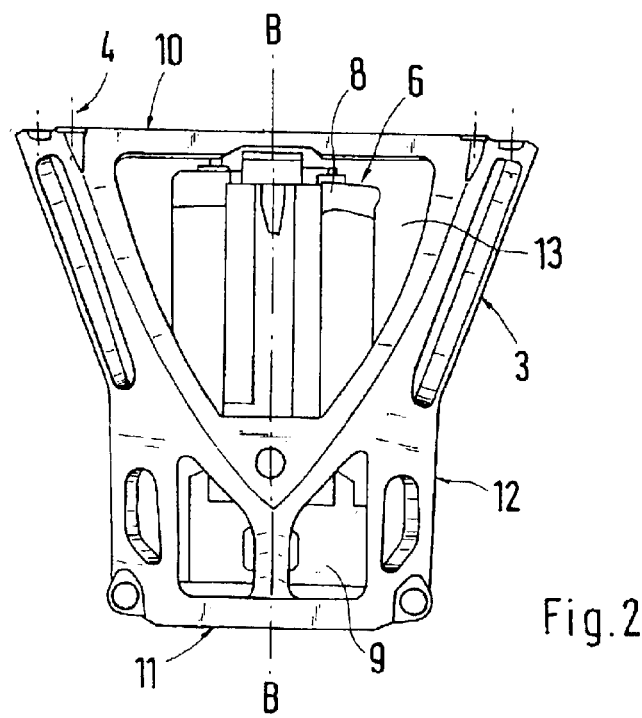
FIG. 2 shows a view from above of the supporting structure with a driving unit, which is indicated diagrammatically therein.
Figure 3:
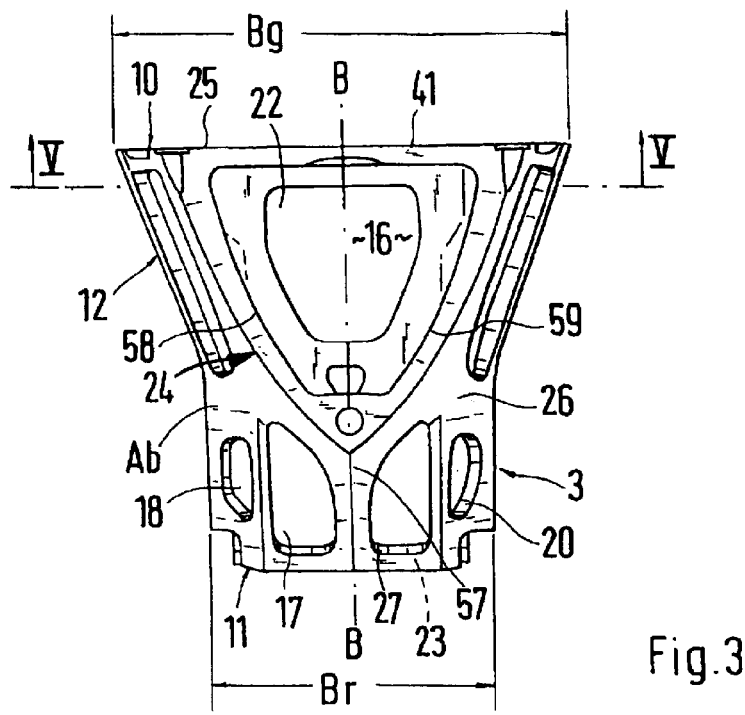
FIG. 3 shows a view, corresponding to that of FIG. 2, however without the driving unit.

It can be seen from FIG. 3 that, when the vehicle is viewed from above, the enveloping device 12 tapers between the connecting region 10 and the rear end region 11 from a first width Be (=total width Bg) to a second reduced width Br. Moreover, the second reduced width Br commences approximately in a central section Ab between the connecting region 10 and the end region 11 of the enveloping device 12, which is constructed symmetrically to a longitudinal median plane B—B of the vehicle and, moreover, where the reinforcing transverse support 26 also extends; and the reduced width Br remains constant up to the rear end region 11.

Figure 5:
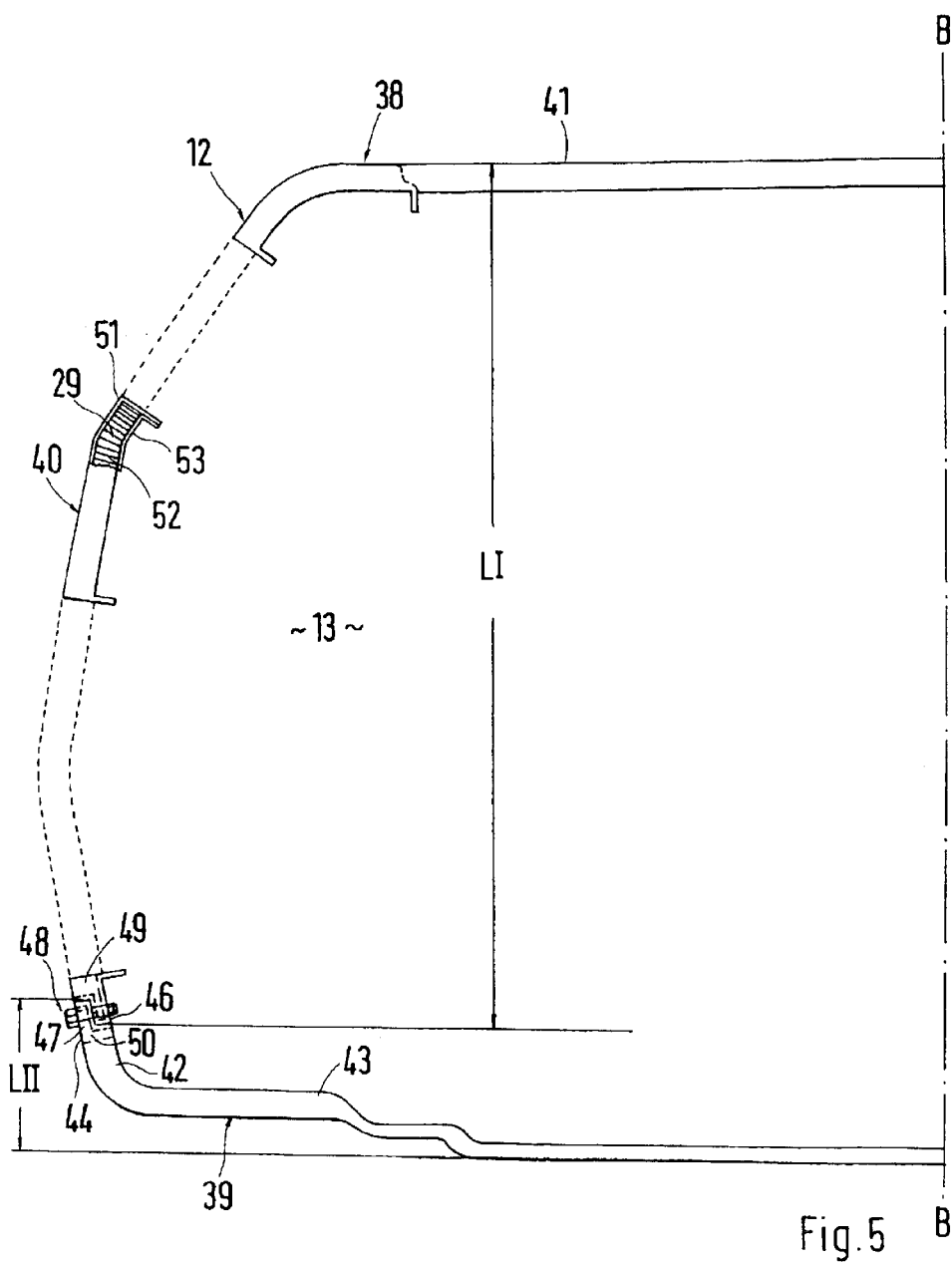
FIG. 5 shows a section along the line V-V of FIG. 3.

The enveloping device 12 is formed by an upper part 38 and a lower part 39 (FIG. 5). The upper part 38 has lateral, upright enveloping sections 40 and a horizontally aligned enveloping section 41. The lower part 39 has upright enveloping sections 42 and a horizontal enveloping section 43. The length LI of the enveloping sections 40 of the upper part 38 is greater than the length LII of the enveloping sections 42 of the lower part 39, and first or second free ends 44 and 45 of the enveloping sections 40 and 42, facing one another, act together. For this purpose, the free ends 44 and 45 are provided with steps 46 and 47, at which these ends are put together in such a manner, that offset connections result. In the region of the offset connections, the upper part 38 and the lower part 39 are connected with one another through the agency of screws 48 and the steps 46, 47 are provided with metallic inserts 49, 50, which are brought into the enveloping sections 40, 42. The longitudinal support 29, which reproduces the basic construction of the supporting device 24, is integrated in the upper part 38 and in one of the enveloping sections 40. Accordingly, this longitudinal support comprises, in cross section, a fiberglass-reinforced outer shell 51, a honeycomb structure 52 and an inner shell 53, which is processed into a structure of high strength.

Figure 4:
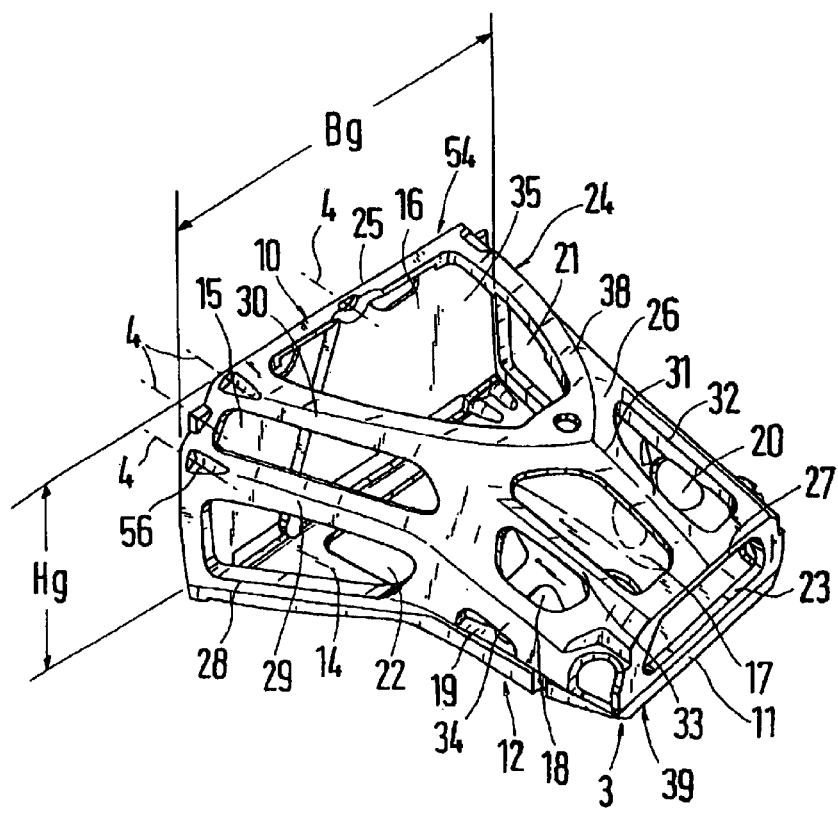
FIG. 4 shows an inclined view of the supporting structure from the left rear and above.

The enveloping device 12 is held with screws 4 at the passenger compartment structure 2 (FIG. 4). For this purpose, first bracket-like shackles 55 and second bracket-like shackles 56, for example, are provided, for example, along the outer periphery 54 of the transverse support 25. The shackles 55 are formed by local expansions and the brackets 56 by moldings in the transverse support. According to FIG. 3, the enveloping device 12, when seen from above, has the opening 16 at the horizontal section 41. The dimensions of the opening 16 are such, that the housing of the driving unit 6 is accessible for achieving aesthetic effects and for carrying out maintenance work. The opening 16 has approximately the shape of a coat of arms-like isosceles triangle, the apex 57 of which is adjacent to the rear end region 11. The legs 58, 59, leading away from this apex 57 and forming the boundary of the opening 16, have an outwardly directed course.

Figure 13:
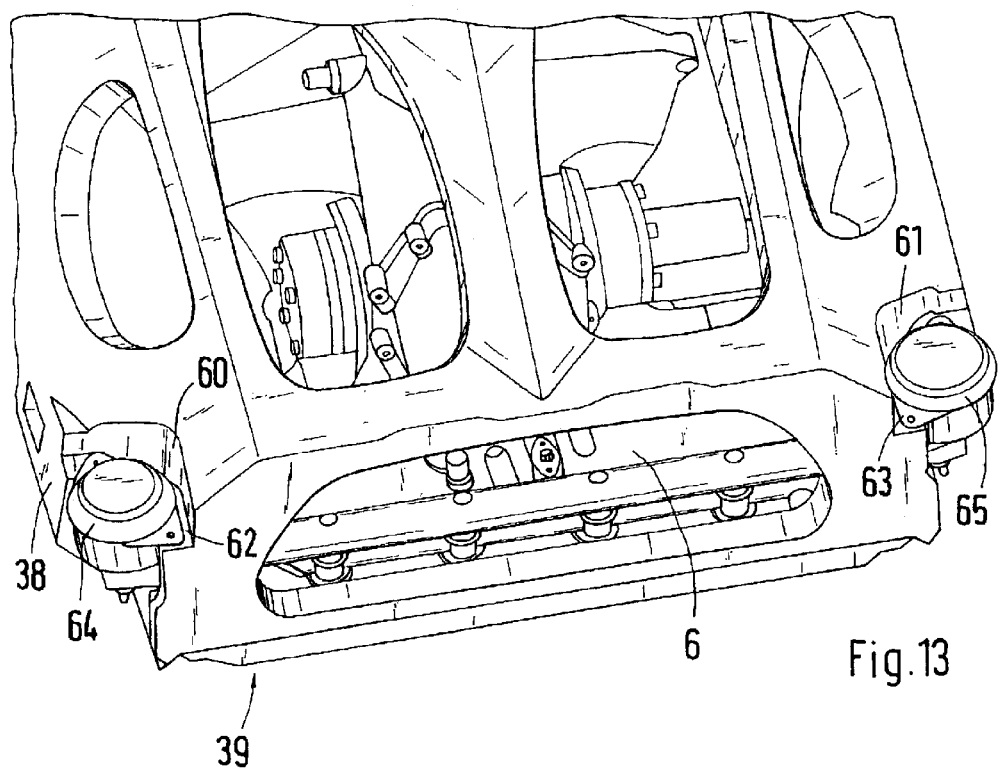
FIG. 13 shows an inclined view from the rear of an end region of the supporting structure.

At the longitudinal sides of the enveloping device 12 and, moreover, adjacent to the rear end region 11, moldings 60, 61 (FIG. 13) are provided, which are provided with supporting brackets 62, 63, which form bearing mountings. The bearing 64, 65 of the driving unit 6 are fastened at the supporting bracket 62, 63.

Finally, FIG. 10 shows that the enveloping device 12 comprises integrated bearing mountings for wheel suspension elements 66 and 67. The wheel suspension element 66 is a spring-damper unit 68, which is mounted by way of a pivoted lever 69 in the enveloping device 12. The pivoted lever 69 is held at a trunnion 70, which is held in a metallic insert 71 of the enveloping device 12 by way of a fastening screw 72. On the other hand, the wheel suspension element 67 is a wishbone 73, which interacts pivotably with a supporting journal 74. The supporting journal 74 is held by way of screws 75, 76 at the metallic inserts 77, 78 of the enveloping device 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A body structure for a motor vehicle with a passenger compartment structure and at least one supporting structure adjoining thereon for accommodating a driving unit and wheel suspension elements, which said supporting structure is connected through holding elements with the passenger compartment structure, wherein the supporting structure, having a region connecting to the passenger compartment structure and a rear end region, is constructed as an enveloping device of high strength which is reinforced with a supporting device and surrounds the driving unit all around at least regionally, the enveloping device having several openings, providing access to the driving unit, and being provided with bearing mountings for the driving unit and the wheel suspension elements, and wherein the enveloping device is formed by are upper part and a lower part.

2. A body structure according to claim 1, wherein the upper part and the lower part are connected with one another through screws in a region of offset connections.

3. A body according to claim 1, wherein said enveloping device is formed of high-strength reinforced plastic material.

4. A body structure according to claim 1, wherein at least the upper part has lateral, upright enveloping sections and a horizontal enveloping section, first free ends of the upper part acting together with second free ends of the lower part.

5. A body structure according to claim 4, wherein the first free ends and second free ends are provided with steps, which form offset connections.

6. A body structure according to claim 5, wherein the upper part and the lower part are connected with one another through screws in a region of the offset connections.

7. A body structure for a motor vehicle with a passenger compartment structure and at least one supporting structure adjoining thereon for accommodating a driving unit and wheel suspension elements, which said supporting structure is connected through holding elements with the passenger compartment structure, wherein the supporting structure, having a region connecting to the passenger compartment structure and a rear end region, is constructed as an enveloping device of high strength which is reinforced with a supporting device and surrounds the driving unit at around at least regionally, the enveloping device having several openings, providing access to the driving unit, and being provided with bearing mountings for the driving unit and the wheel suspension elements, and wherein the enveloping device, adjacent to the connecting region has a support means, which is integrated in the enveloping device, positioned adjacent said passenger compartment structure to provide support in the transverse direction of the motor vehicle.

8. A body structure according to claim 7, wherein the closing wall of the enveloping device is provided with a local cross-sectional expansion as the bearing mounting for the driving unit.

9. A body structure according to claim 8, wherein the cross-sectional expansion extends over a significant portion of a height of the closing wall and has a shape of an inverted V.

10. A body structure according to claim 7, wherein said enveloping device is formed of high-strength reinforced plastic material.

11. A body structure according to claim 10, wherein said plastic material is reinforced with fiberglass.

12. A body for a motor vehicle with a passenger compartment structure and at least one supporting structure adjoining thereon for accommodating a driving unit and wheel suspension elements, which said supporting structure is connected through holding elements with the passenger compartment structure, wherein the supporting structure, having a region connecting to the passenger compartment structure and a rear end region, is constructed as an enveloping device of high strength which is reinforced with a supporting device and surrounds the driving unit all around at least regionally, the enveloping device having several openings, providing access to the driving unit, and being provided with bearing mountings for the driving unit and the wheel suspension elements, and wherein a support means is integrated into the enveloping device, positioned adjacent said passenger compartment structure to provide support in the transverse direction of the motor vehicle.

13. A body structure according to claim 12, wherein said enveloping device is formed of high-strength reinforced plastic material.

14. A body structure according to claim 13, wherein said plastic material is reinforced with fiberglass.

15. A body structure for a motor vehicle with a passenger compartment structure and at least one supporting structure adjoining thereon for accommodating a driving unit and wheel suspension elements, which said supporting structure is connected through holding elements with the passenger compartment structure, wherein the supporting structure, having a region connecting to the passenger compartment structure and a rear end region, is constructed as an enveloping device of high strength which is reinforced with a supporting device and surrounds the driving unit all around at least regionally, the enveloping device having several openings, providing access to the driving unit, and being provided with bearing mountings for the driving unit and the wheel suspension elements, and wherein the enveloping device and the passenger compartment structure are connected with one another through several screws, which are aligned in a longitudinal direction of the vehicle.

16. A body structure according to claim 15, wherein at least a portion of the screws is provided adjacent to an external periphery of a transverse support of the supporting device of the enveloping device.

17. A body structure according to claim 16, wherein the transverse support has first and second bracket-like shackles for accommodating the screws.

18. A body structure according to claim 15, wherein said enveloping device is formed of high-strength reinforced plastic material.

19. A body structure for a motor vehicle with a passenger compartment structure and at least one supporting structure adjoining thereon for accommodating a driving unit and wheel suspension elements, which said supporting structure is connected through holding elements with the passenger compartment structure, wherein the supporting structure, having a region connecting to the passenger compartment structure and a rear end region, is constructed as an enveloping device of high strength which is reinforced with a supporting device and surrounds the driving unit all around at least regionally, the enveloping device having several openings, providing access to the driving unit, and being provided with bearing mountings for the driving unit and the wheel suspension elements, wherein, when viewed from above, an opening of the enveloping device is dimensioned so that the housing of the driving unit is visible and accessible, and wherein the opening as a shape of an isosceles triangle, the apex of which is adjacent to the rear end region of legs of the triangle, leading away from the apex, having an outwardly directed, arc-shaped course.

20. A body structure according to claim 19, wherein said enveloping device is formed of high-strength reinforced plastic material.

21. A body structure having a front to rear axis, left to right axis, and top-to-bottom axis for a motor vehicle with a passenger compartment structure and at least one supporting structure adjoining thereon for accommodating a driving unit and wheel suspension elements, which said supporting structure is connected through holding elements with the passenger compartment structure, wherein the supporting structure, having a region connecting to the passenger compartment structure and a rear end region, is constructed as an enveloping device of high strength which is reinforced with a supporting device and surrounds the driving unit completely in the front to rear axis, left to right axis, and top-to-bottom axis, the enveloping device having several openings, providing access to the driving unit, and being provided with bearing mountings for the driving unit and the wheel suspension elements.

22. The body structure according to claim 21, wherein the enveloping device, adjacent to the connecting region has a closing wall, which is integrated in the enveloping device.

23. The body structure according to claim 22, wherein the closing wall of the enveloping device is provided with a local cross-sectional expansion as the bearing mounting for the driving unit.

24. The body structure according to claim 23, wherein the cross-sectional expansion extends over a significant portion of a height of the closing wall and has a shape of an inverted V.

25. The body structure according to claim 21, wherein the enveloping device, when viewed from above, tapers between the connecting region and the rear end region from a first, largest width to a second, reduced width.

26. The body structure according to claim 25, wherein the second, reduced width commences in a central section of the enveloping device between the connecting region and the end region, the second, reduced width extending approximately constantly towards the rear end region.

27. The body structure according to claim 21, wherein the enveloping device is formed by an upper part and a lower part.

28. The body structure according to claim 27, wherein the upper part and the lower part are connected with one another through screws in a region of offset connections.

29. The body structure according to claim 27, wherein at least the upper part has lateral, upright enveloping sections and a horizontal enveloping section, first free ends of the upper part acting together with second free ends of the lower part.

30. The body structure according to claim 29, wherein the first free ends and second free ends are provided with steps, which form offset connections.

31. The body structure according to claim 30, wherein the upper part and the lower part are connected with one another through screws in a region of the offset connections.

32. The body structure according to claim 21, wherein the enveloping device and the passenger compartment structure are connected with one another through several screws, which are aligned in a longitudinal direction of the vehicle.

33. The body structure according to claim 32, wherein at least a portion of the screws is provided adjacent to an external periphery of a transverse support of the supporting device of the enveloping device.

34. The body structure according to claim 33, wherein the transverse support has first and second bracket-like shackles for accommodating the screws.

35. The body structure according to claim 21, wherein, when viewed from above, an opening of the enveloping device is dimensioned so that the housing of the driving unit is visible and accessible.

36. The body structure according to claim 35, wherein the opening has a shape of an isosceles triangle, the apex of which is adjacent to the rear end region of legs of the triangle, leading away from the apex, having an outwardly directed, arc-shaped course.

37. The body structure according to claim 21, wherein, adjacent to the rear end region, moldings for accommodating the bearings of the driving unit are provided at longitudinal sides of the enveloping device.

38. The body structure to claim 37, wherein the moldings have approximately horizontal supporting brackets, on which the bearings rest and to which the bearings are attached.

39. A method of using a body structure for a motor vehicle comprising making the body structure of claim 21.

40. A method of using a body structure of a motor vehicle comprising utilizing the body structure of claim 21.

* * * * *